United States Patent
Bates

(10) Patent No.: US 8,752,025 B2
(45) Date of Patent: *Jun. 10, 2014

(54) PROTECTING BREAKPOINTS IN A SOFTWARE DEBUGGER

(71) Applicant: International Business Machines Corporation, Armonk, NY (US)

(72) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,150

(22) Filed: Dec. 10, 2012

(65) Prior Publication Data

US 2013/0104108 A1     Apr. 25, 2013

Related U.S. Application Data

(63) Continuation of application No. 12/914,279, filed on Oct. 28, 2010.

(51) Int. Cl.
*G06F 9/44* (2006.01)
(52) U.S. Cl.
USPC .......................... 717/129; 717/124; 717/127
(58) Field of Classification Search
None
See application file for complete search history.

(56) References Cited

U.S. PATENT DOCUMENTS

| | | | | |
|---|---|---|---|---|
| 6,851,089 B1 * | 2/2005 | Erickson et al. | | 715/255 |
| 7,039,901 B2 * | 5/2006 | Hunter et al. | | 717/124 |
| 7,131,114 B2 * | 10/2006 | Nguyen et al. | | 717/129 |
| 7,185,321 B1 * | 2/2007 | Roe et al. | | 717/134 |
| 7,383,539 B2 * | 6/2008 | Bates et al. | | 717/129 |
| 7,543,186 B2 * | 6/2009 | Schultz | | 714/35 |
| 7,890,935 B2 * | 2/2011 | Bates | | 717/129 |
| 8,103,496 B1 * | 1/2012 | Roe et al. | | 703/28 |
| 8,122,292 B2 * | 2/2012 | Nanjundaswamy | | 714/34 |
| 8,132,160 B2 * | 3/2012 | Bates et al. | | 717/129 |
| 2006/0200807 A1 * | 9/2006 | Bates et al. | | 717/129 |
| 2007/0168979 A1 * | 7/2007 | Kumar et al. | | 717/124 |
| 2007/0283330 A1 * | 12/2007 | Bates | | 717/129 |
| 2008/0127114 A1 * | 5/2008 | Vasudevan | | 717/129 |
| 2008/0250397 A1 * | 10/2008 | Dahms et al. | | 717/129 |
| 2009/0320001 A1 | 12/2009 | Bates et al. | | |
| 2010/0005249 A1 * | 1/2010 | Bates et al. | | 711/154 |
| 2012/0110552 A1 * | 5/2012 | Bates | | 717/129 |
| 2013/0104108 A1 * | 4/2013 | Bates | | 717/129 |

OTHER PUBLICATIONS

Just-In-Time Compiler Library: 12. Hooking a breakpoint debugger into libjit, http://www.gnu.org/projects/dotgnu/libjit-doc/libjit_12.html, May 11, 2008.

* cited by examiner

*Primary Examiner* — Don Wong
*Assistant Examiner* — Hossain Morshed
(74) *Attorney, Agent, or Firm* — Martin & Associates, LLC; Derek P. Martin

(57) ABSTRACT

A debugger that includes a breakpoint protection mechanism that detects when the program being debugged has been modified to overwrite one or more instructions corresponding to existing breakpoints. When the debugger halts execution of a program being debugged, all of the set breakpoints are checked by determining whether the instruction corresponding to each breakpoint has changed. If any of the instructions corresponding to the breakpoints has changed, the corresponding breakpoint is removed. An optional warning may be provided to the user to inform the user of any removed breakpoints.

5 Claims, 6 Drawing Sheets

| Breakpoint Table | | | |
|---|---|---|---|
| BP# | Address | Original Op Code | |
| 1 | 0x7982625 | Op Code 1 | — 220A |
| 2 | 0x7982718 | Op Code 2 | — 220B |
| ⋮ | ⋮ | ⋮ | |
| N | 0x8075322 | Op Code N | — 220N |

| Program | | |
|---|---|---|
| Address | Op Code | |
| ⋮ | ⋮ | |
| 0x7982625 | BP Trap | — 320A |
| ⋮ | ⋮ | |
| 0x7982718 | BP Trap | — 320B |
| ⋮ | ⋮ | |
| 0x8075322 | BP Trap | — 320N |
| ⋮ | ⋮ | |

PROTECTING BREAKPOINTS IN A SOFTWARE DEBUGGER

BACKGROUND

1. Technical Field

This disclosure generally relates to debuggers, and more specifically relates to breakpoints in debuggers.

2. Background Art

Computer systems have evolved into extremely sophisticated devices, and may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program. Debuggers allow setting breakpoints in a computer program. When a breakpoint is encountered, execution of the computer program is halted to allow inspecting the state of the computer program, or to allow executing instructions one at a time in a single step mode.

Breakpoints are typically implemented in a debugger using a breakpoint table that is maintained in the debugger. When a user sets a breakpoint, the breakpoint is written to the breakpoint table. The original instruction at the location in the code where the breakpoint is set is written to the breakpoint table. The instruction in the code is then replaced with a software trap instruction that turns control over to the debugger when executed. When the breakpoint is no longer desired, the software trap instruction in the code is replaced with the original instruction stored in the breakpoint table, thereby restoring the code to its original state, and the breakpoint is then removed from the breakpoint table.

A problem may arise when debugging self-modifying code. One example of self-modifying code is code that is generated by a Just-In-Time (JIT) compiler. Using traditional breakpoints in self-modifying code can lead to unexpected and undesirable behavior. For example, let's assume a user sets a breakpoint in the code, which causes the original instruction to be stored in the breakpoint table, and causes a trap instruction to be inserted in the place of the original instruction. If a JIT compiler then overwrites the trap instruction, undesirable things will happen. First, the debugger thinks a breakpoint is set at that instruction because its breakpoint table indicates the breakpoint is set, but execution of the code will not halt because the trap instruction was overwritten by a different instruction. Second, because the debugger thinks the breakpoint is still set, when the user removes the breakpoint, the instruction that was written by the JIT compiler will be overwritten with the old instruction that was originally in that location. This will cause the code to execute incorrectly, and leads to unpredictable and undesirable results. Without a way to protect breakpoints from being affected by self-modifying code, known debuggers will continue to suffer from the problems described above.

BRIEF SUMMARY

A debugger includes a breakpoint protection mechanism that protects breakpoints by checking the integrity of a trap instruction for each breakpoint each time the debugger halts the program. If the trap instruction has been overwritten, the breakpoint is removed from the debugger's breakpoint table. A warning may also be sent to the user to inform the user the breakpoint is no longer set. In this manner the debugger is aware when an instruction corresponding to a breakpoint has been overwritten, allowing the debugger to take appropriate action to maintain the integrity of its breakpoints.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a block diagram that shows one suitable implementation for a breakpoint table;

FIG. 3 is a block diagram of an example program;

Figure 4:
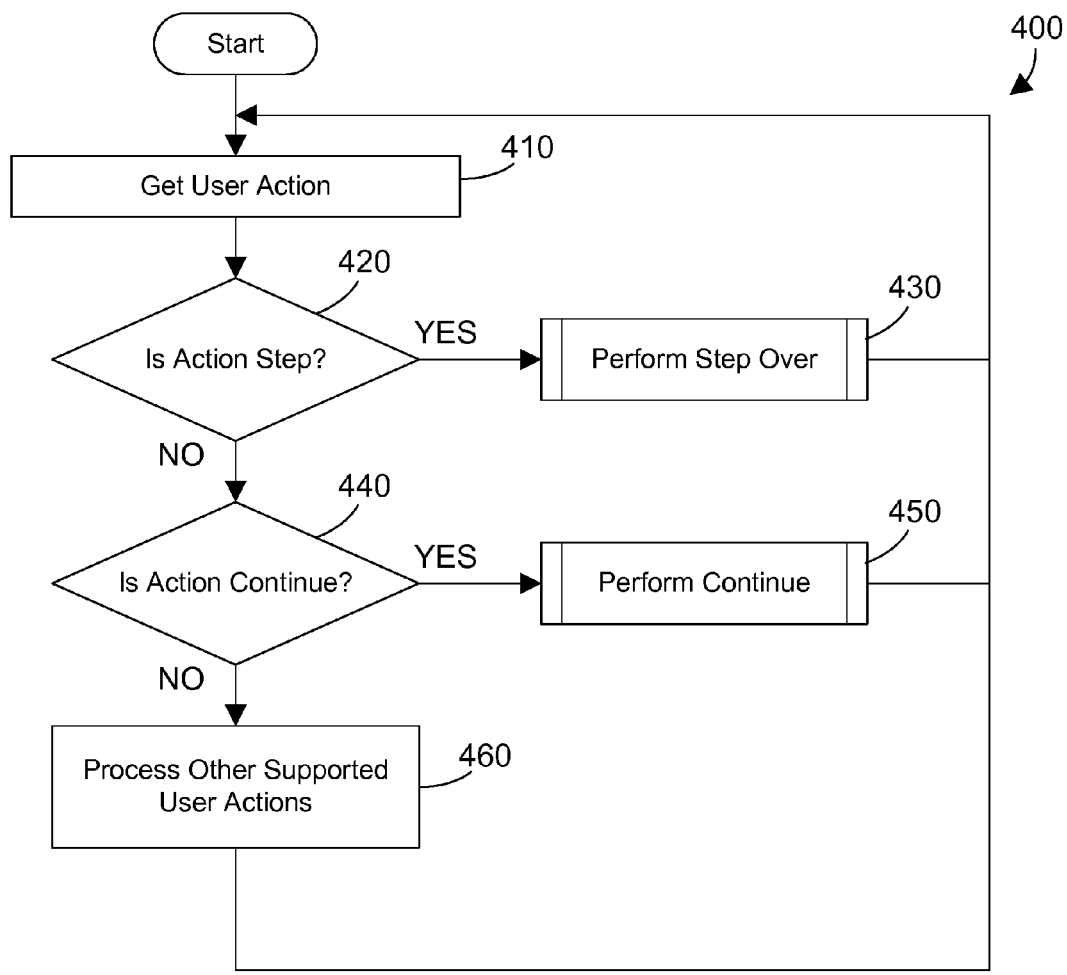
FIG. 4 is a flow diagram of a method for a debugger to perform user actions.
Figure 5:
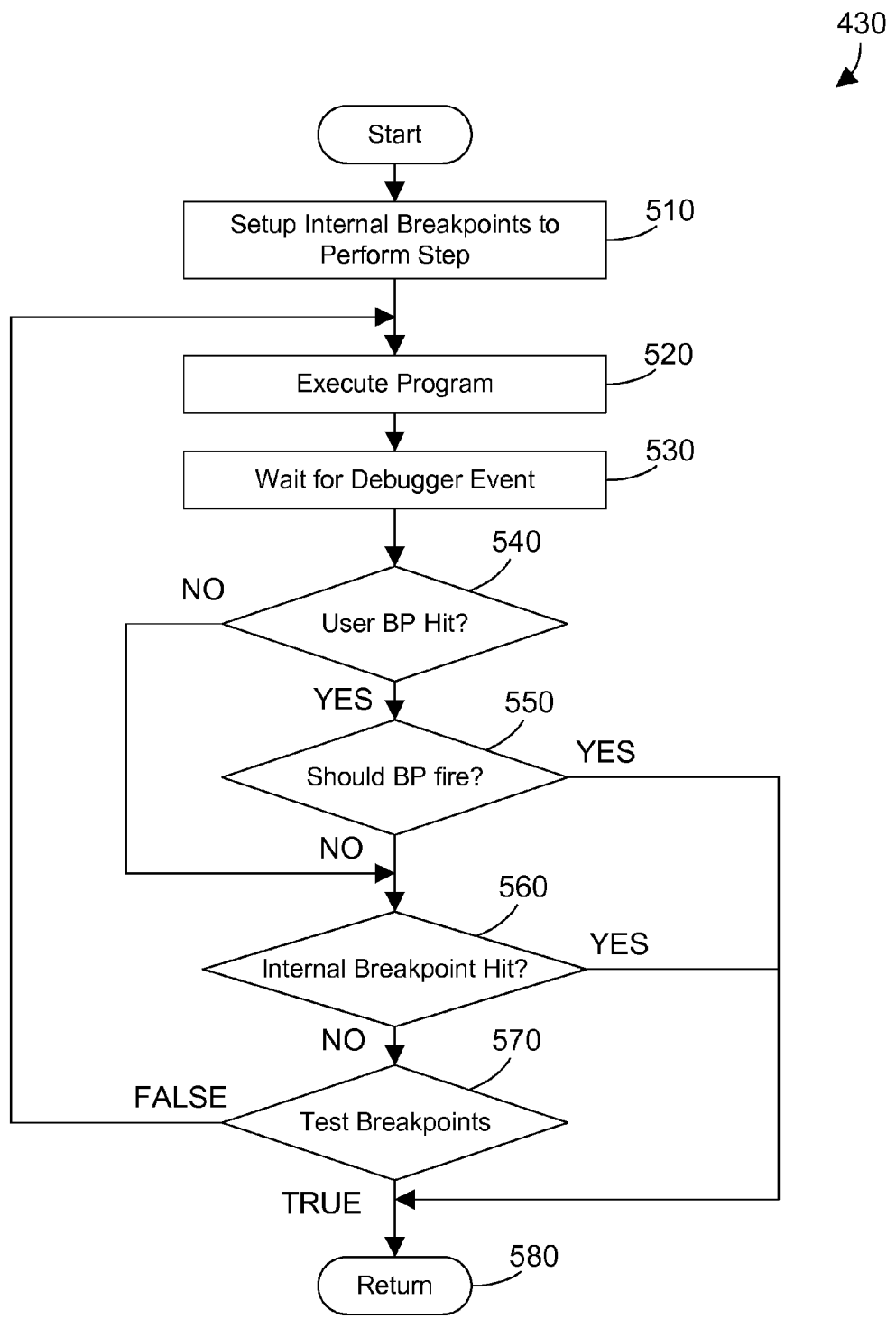
FIG. 5 is a flow diagram of one suitable implementation of step 430 in FIG. 4.
Figure 6:
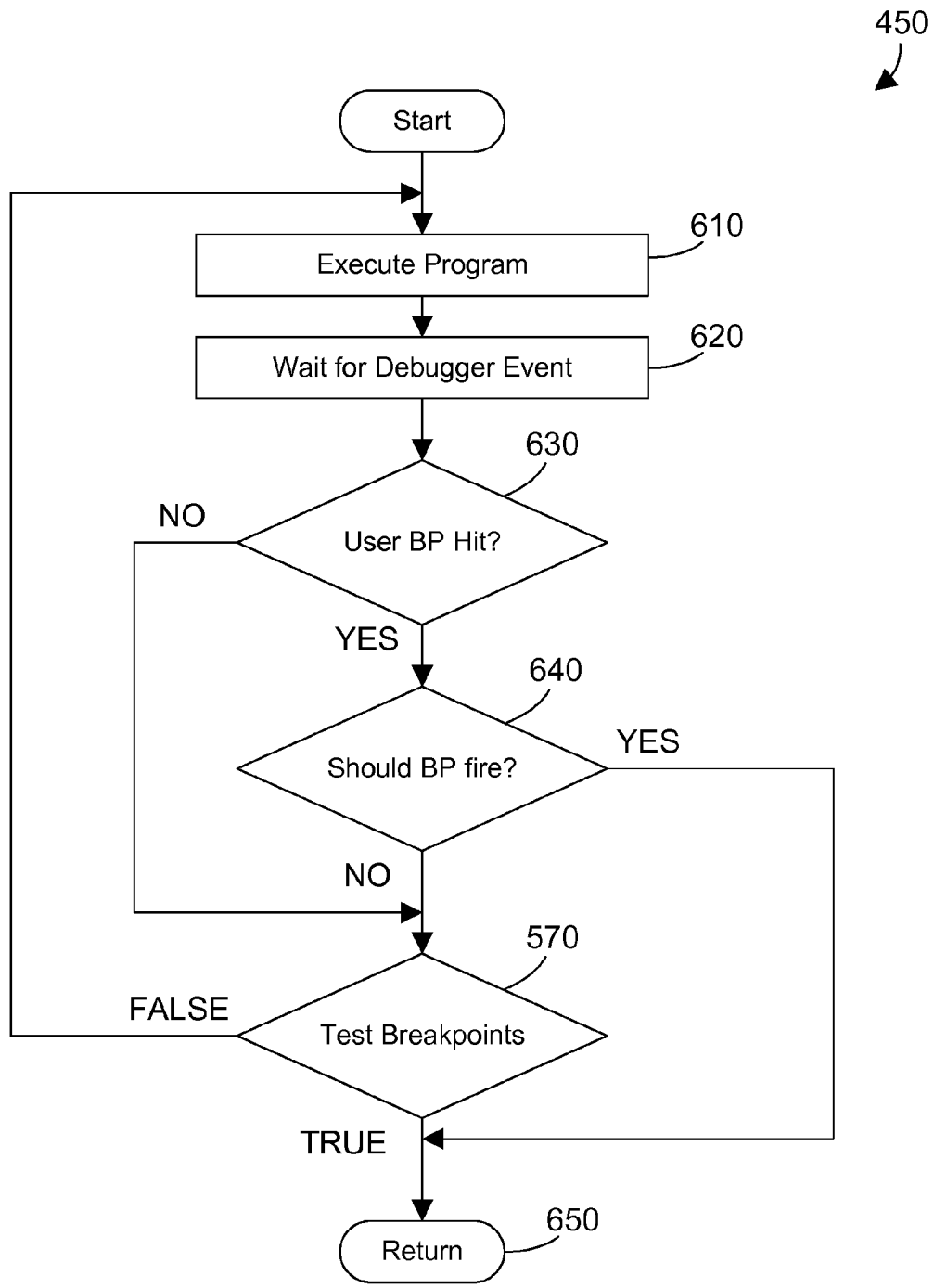
Figure 7:
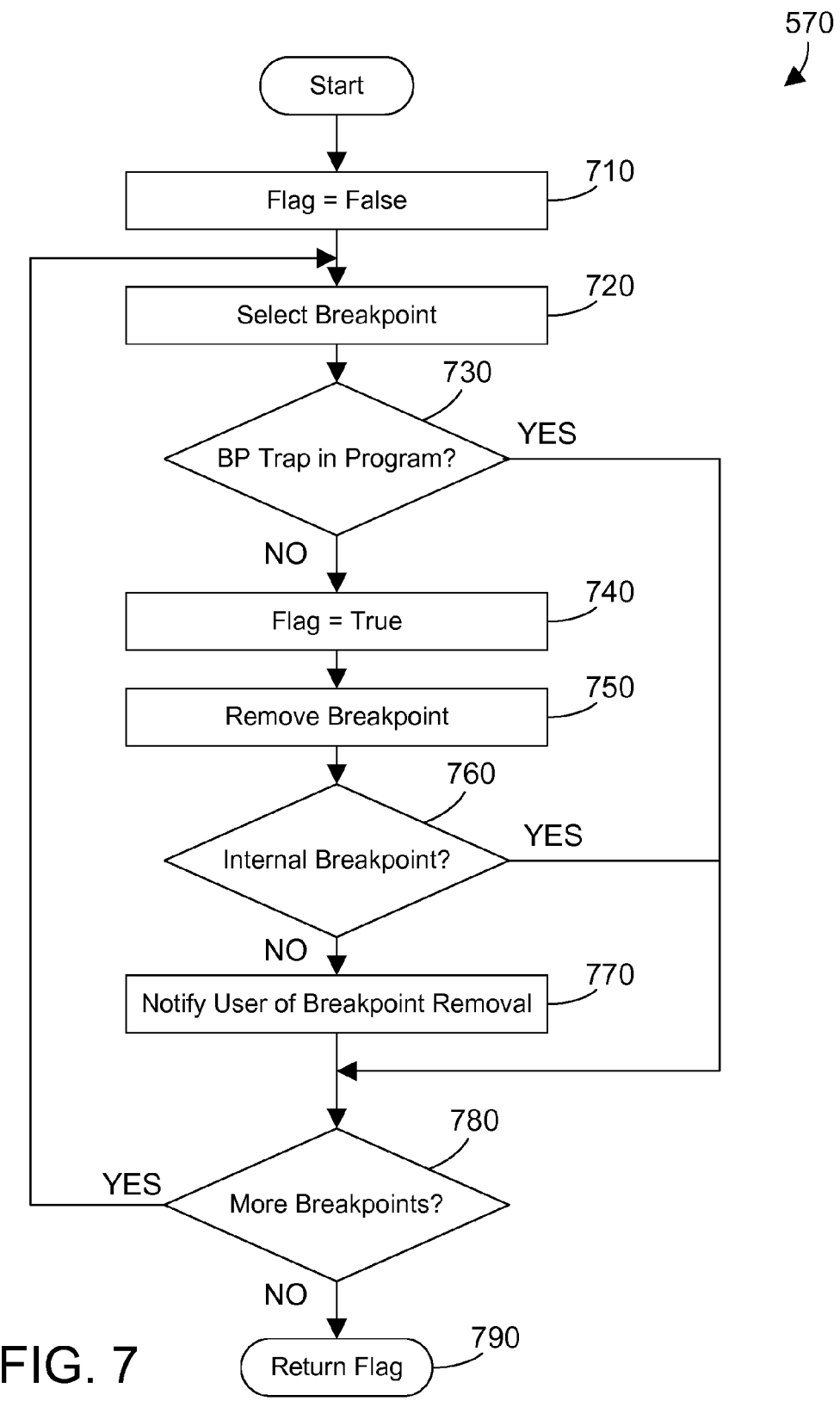

FIG. 6 is a flow diagram of one suitable implementation of step 450 in FIG. 4; and FIG. 7 is a flow diagram of one suitable implementation of step 570 in FIGS. 5 and 6.

DETAILED DESCRIPTION

The claims and disclosure herein provide a debugger that includes a breakpoint protection mechanism that detects when the program being debugged has been modified to overwrite one or more instructions corresponding to existing breakpoints. When the debugger halts execution of a program being debugged, all of the set breakpoints are checked by determining whether the instruction corresponding to each breakpoint has changed. If any of the instructions corresponding to the breakpoints has changed, the corresponding breakpoint is removed. An optional warning may be provided to the user to inform the user of any removed breakpoints.

Figure 1:
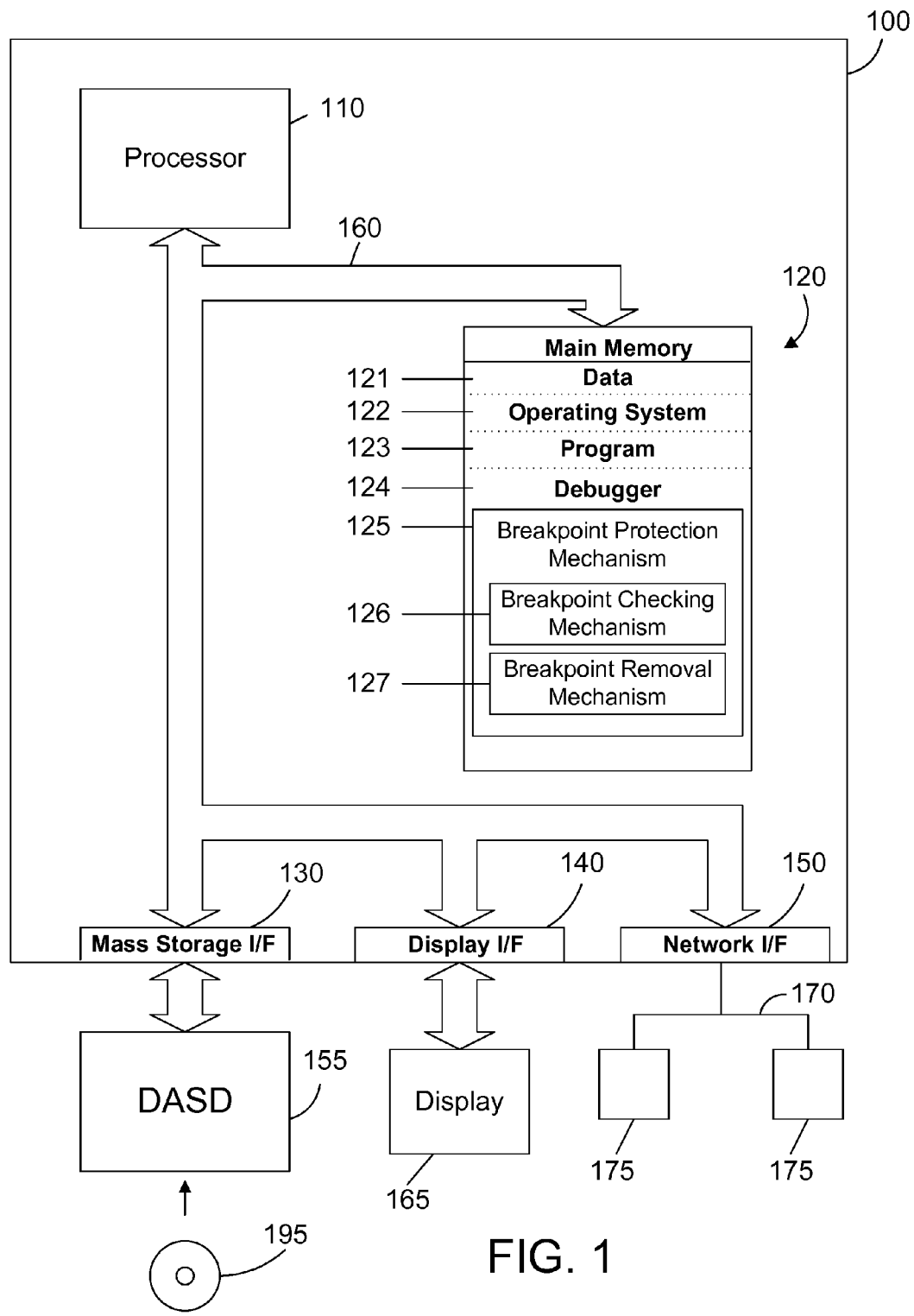
FIG. 1 is a block diagram of an apparatus that includes a breakpoint protection mechanism that checks to see if any set breakpoints have been overwritten, and if so, takes appropriate action.

Referring to FIG. 1, a computer system 100 is one suitable implementation of a computer system that includes a debugger with a breakpoint protection mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a program 123, and a debugger 124. Data 121 represents any data that serves as input to or output from any program in computer system 100. Operating system 122 is a multitasking operating system. Program 123 is any code that needs to be debugged, whether the code is a complete application, a module, or some subset of an application or module. The debugger 124 includes a breakpoint protection mechanism 125 that includes a breakpoint checking mechanism 126 and a breakpoint removal mechanism 127. The breakpoint checking mechanism 126 checks breakpoints set in the debugger when the debugger halts execution of the program 123. The breakpoint removal mechanism 127 removes any breakpoints for instructions that were changed since the breakpoint was set. In this manner, the breakpoint protection mechanism 125 monitors breakpoints, and prevents unpredictable behavior when self-modifying code changes instructions corresponding to any set breakpoint.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, program 123 and debugger 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the debugger 124.

Although computer system 100 is shown to contain only a single processor and a single system bus, those skilled in the art will appreciate that a breakpoint protection mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 2, a breakpoint table 210 represents one suitable way for the debugger 124 to track breakpoints. The breakpoint table 210 includes multiple entries, shown in FIG. 2 as 220A, 220B, . . . , 220N. Each entry in the breakpoint table 210 corresponds to a breakpoint in the program 123. Entry 220A shows breakpoint #1 corresponds to address 0x7982625, with the original instruction (i.e., op code) of Op Code 1. When breakpoint #1 is set, the debugger copies Op Code 1 from the program, and replaces the original op code with a trap instruction that will generate the breakpoint, as is known in the art. This is shown in FIG. 3. The program 123 includes addresses and corresponding instructions in the form of op codes. When breakpoint #1 is set, the entry 220A in the breakpoint table 210 is created, with the original op code Op Code 1 being written from the program 123 to the entry 220A. The Op Code 1 in the program at that location in the program is overwritten with a breakpoint trap instruction, as shown at 320A in FIG. 3. When the program executes the breakpoint trap instruction in entry 320A, execution of the program is halted, and control is passed to the debugger. In similar fashion, breakpoint #2 shown as entry 220B in FIG. 2 specifies the address of the breakpoint, along with the original op code Op Code 2 that was in the program. The original Op Code 2 at address 0x7982718 is replaced with the breakpoint trap instruction, as shown at 320B in FIG. 3. Breakpoint #N shown as entry 220N in FIG. 2 specifies the address of the breakpoint, along with the original op code Op Code N that was in the program. The original Op Code N at address 0x8075322 is replaced with the breakpoint trap instruction, as shown at 320N in FIG. 3.

Note the breakpoint trap instruction at 320A, 320B and 320C may be the same trap instruction, or may be different trap instructions, depending on the type of the breakpoint or other factors. For the discussion herein, we assume the breakpoints corresponding to entries 220A, 220B, . . . , 220N in FIG. 2 are user-defined breakpoints. However, the disclosure and claims herein expressly extend to both user-defined breakpoints as well as debugger-defined breakpoints, such as breakpoints that are set by the debugger to single-step through a program.

As discussed in the Background Art section above, a problem arises when self-modifying code, such as code produced by a Just-In-Time (JIT) compiler, modifies a program after breakpoints are set. For example, let's assume a JIT compiler generates a new instruction at 320A in FIG. 3, and thus overwrites the breakpoint trap instruction. The debugger has no idea the breakpoint trap instruction has been overwritten. As a result, the debugger still thinks the breakpoint is valid because breakpoint #1 is still in the breakpoint table 210 in FIG. 2. The result is that breakpoint #1 will never be encountered. Another undesirable effect occurs when the user deletes a breakpoint from the program. Using the same example above, if the JIT compiler overwrites the BP Trap instruction at 320A in FIG. 3, and if a user then instructs the debugger to delete breakpoint #1, the debugger will attempt to restore the original op code Op Code 1 by writing Op Code 1 to location 320A. The result is the instruction from the JIT compiler that overwrote the BP Trap instruction is then overwritten with the original op code. The result is a program with uncertain and unpredictable behavior. The breakpoint protection mechanism disclosed and claimed herein prevents both of these undesirable effects of self-modifying code overwriting one or more breakpoints by monitoring the instructions for defined breakpoints when the debugger halts, and automatically removing any breakpoints whose corresponding instructions have been overwritten.

Referring to FIG. 4, a method 400 represents steps performed by the debugger 124 in FIG. 1. The debugger gets a user action (step 410). If the action is a step (step 420=YES), the debugger performs the step over function (step 430), and returns to get the next user action (step 410). Details of the step over function are shown in FIG. 5 and are discussed below. If the action is not a step (step 420=NO), and if the action is a continue (step 440=YES), the debugger performs the continue function (step 450). Details of the continue function are shown in FIG. 6 and are discussed below. If the action is not a step (step 420=NO), and if the action is not a continue (step 440=NO), the debugger processes the user action (step 460), as is known in the art.

Referring to FIG. 5, one suitable implementation of the step over function shown as step 430 in FIG. 4 is shown by method 430 in FIG. 5. The debugger sets up internal breakpoints to perform the step function (step 510). The program is then executed (step 520). The debugger then waits for a debugger event (step 530). When a debugger event occurs, if the debugger event is a user breakpoint hit (step 540=YES), and if the breakpoint should fire (step 550=YES), method 430 returns (step 580). If the debugger event is a user breakpoint hit (step 540=YES), and the breakpoint should not fire (step 550=NO), method 430 checks to see if the event is an internal breakpoint hit (step 560). If so (step 560=YES), method 430 returns (step 580). If not (step 560=NO), the existing breakpoints are tested (step 570). If the instructions corresponding to the existing breakpoints have not been overwritten (step 570=FALSE), method 430 loops back to step 520 and continues to execute the program. If one or more of the instructions corresponding to the existing breakpoints have been overwritten (step 570=TRUE), method 430 returns (step 580). If the debugger event was not a user breakpoint hit (step 540=NO), method 430 goes to step 560 to determine whether an internal breakpoint was hit. If the debugger event was an internal breakpoint hit (step 560=YES), method 430 returns (step 580). If the debugger event was not an internal breakpoint hit (step 560=NO), the breakpoints are tested in step 570, and method 430 either loops back (step 570=FALSE) to continue executing the program at step 520 if none of the instructions corresponding to set breakpoints have changed, or returns (step 570=TRUE and step 580) if one or more of the instructions corresponding to set breakpoints have changed.

Referring to FIG. 6, one suitable implementation of the continue function shown as step 450 in FIG. 4 is shown by method 450 in FIG. 6. The debugger executes the program (step 610), and waits for a debugger event (step 620). If the debugger event is a user breakpoint hit (step 630=YES), and if the breakpoint should fire (step 640=YES), method 450 returns (step 650). If the debugger event is a user breakpoint hit (step 630=YES), and if the breakpoint should not fire (step 640=NO), the breakpoints are tested in step 570. If the instructions corresponding to the existing breakpoints have not been overwritten (step 570=FALSE), method 450 loops back to step 610 and continues to execute the program. If one or more of the instructions corresponding to the existing breakpoints have been overwritten (step 570=TRUE), method 450 returns (step 650). If the debugger event was not a user breakpoint hit (step 630=NO), the breakpoints are tested in step 570, and method 450 either loops back (step 570=FALSE) to continue executing the program at step 610 if none of the instructions corresponding to set breakpoints have changed, or returns (step 570=TRUE and step 650) if one or more of the instructions corresponding to set breakpoints have changed.

One suitable implementation for step 570 in FIGS. 5 and 6 for testing breakpoints is shown as method 570 in FIG. 7. A flag is set to false (step 710). A breakpoint is selected (step 720). If the instruction corresponding to the breakpoint has the breakpoint trap instruction the debugger originally wrote (step 730=YES), the instruction for this breakpoint has not been overwritten. If there are more breakpoints (step 780=YES), the next breakpoint is selected (step 720), and execution continues. If the instruction corresponding to the breakpoint has a different instruction than the breakpoint instruction that was originally written (step 730=NO), the flag is set to true (step 740), and the breakpoint is removed (step 750). When a breakpoint table such as 210 in FIG. 2 is used to track breakpoints, the breakpoint is removed in step 750 by deleting the entry in the breakpoint table 210 corresponding to the breakpoint. If the breakpoint that was removed is not an internal breakpoint (step 760=NO), which means the breakpoint was a user-defined breakpoint, the user is notified of the breakpoint removal (step 770). When there are more breakpoints to process (step 780=YES), method 570 loops back to step 720 and continues until there are no more breakpoints to process (step 780=NO), at which point method 570 returns the flag (step 790). If the flag returned in step 790 is FALSE, this means none of the instructions corresponding to set breakpoints has been overwritten. If the flag returned in step 790 is TRUE, this means one or more of the instructions corresponding to set breakpoints have been overwritten. By checking all instructions corresponding to defined breakpoints each time the debugger halts execution of the program, the debugger can take appropriate measures to protect breakpoints and ensure their integrity when there is the possibility that an instruction corresponding to a breakpoint could be overwritten without the debugger knowing.

The disclosure and claims disclose a debugger that includes a breakpoint protection mechanism that checks each time the program is halted by the debugger to see if the instructions corresponding to set breakpoints have been overwritten. If so, the breakpoint corresponding to the changed instruction is removed. The user may be notified of breakpoints automatically removed by the breakpoint protection mechanism. In this manner, a debugger can account for self-modifying code that might overwrite an instruction corresponding to a set breakpoint.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for a user to debug a program with a debugger, the method comprising the steps of:
   providing at least one processor;
   providing a memory coupled to the at least one processor;
   providing the program in the memory;
   providing the debugger in the memory;
   the at least one processor executing the debugger, the debugger performing the steps of:
   (A) allowing the user to define a plurality of breakpoints in the program;
   (B) creating an entry in a breakpoint table each time the user creates one of the plurality of breakpoints in step (A);
   (C) each time the debugger halts execution of the program for a breakpoint defined in step (A), performing the steps of:
   (C1) reading a plurality of instructions in the program corresponding to the plurality of breakpoints;
   (C2) determining whether any of the plurality of instructions in the program corresponding to the plurality of breakpoints changed; and
   (C3) for each of the plurality of instructions in the program that changed, removing the corresponding breakpoint.

2. The method of claim 1 further comprising the step of providing notification to a user of the debugger for each breakpoint removed in step (C3).

3. The method of claim wherein step (C3) comprises the step of removing each entry in the breakpoint table corresponding to each of the plurality of instructions in the program that changed.

4. The method of claim 1 wherein each of the plurality of instructions in the program that corresponds to the plurality of breakpoints comprises a trap instruction that gives control to the debugger.

5. A computer-implemented method for a user to debug a program with a debugger, the method comprising the steps of:
   providing at least one processor;
   providing a memory coupled to the at least one processor;
   providing the program in the memory;
   providing the debugger in the memory;
the at least one processor executing the debugger, the debugger performing the steps of:
   (A) allowing the user to define a plurality of breakpoints in the program;
   (B) creating an entry in a breakpoint table for each of the plurality of breakpoints defined by the user in step (A);

(C) writing an original instruction in the program corresponding to each breakpoint defined by the user in step (A) to a corresponding entry in the breakpoint table;

(D) replacing a plurality of instructions in the program with a plurality of corresponding trap instructions that give control to the debugger at locations defined by the breakpoints defined by the user in step (A);

(E) each time the debugger halts execution of the program, performing the steps of:

(E1) reading the plurality of instructions in the program corresponding to the plurality of breakpoints defined in the breakpoint table;

(E2) determining whether any of the plurality of instructions in the program corresponding to the plurality of breakpoints changed;

(E3) for each of the plurality of instructions in the program that changed, removing the corresponding breakpoint by removing the entry in the breakpoint table corresponding to the breakpoint; and (E4) for each breakpoint removed in step (E3), providing notification to the user that the breakpoint was removed.

\* \* \* \* \*